June 28, 1966  A. R. BOYLE ETAL  3,258,776
GRAPH PLOTTING MECHANISM

Filed Jan. 9, 1964  3 Sheets-Sheet 2

Archibald R. Boyle,
Thomas McP. Glass
INVENTORS

BY Young + Thompson
ATTORNEYS

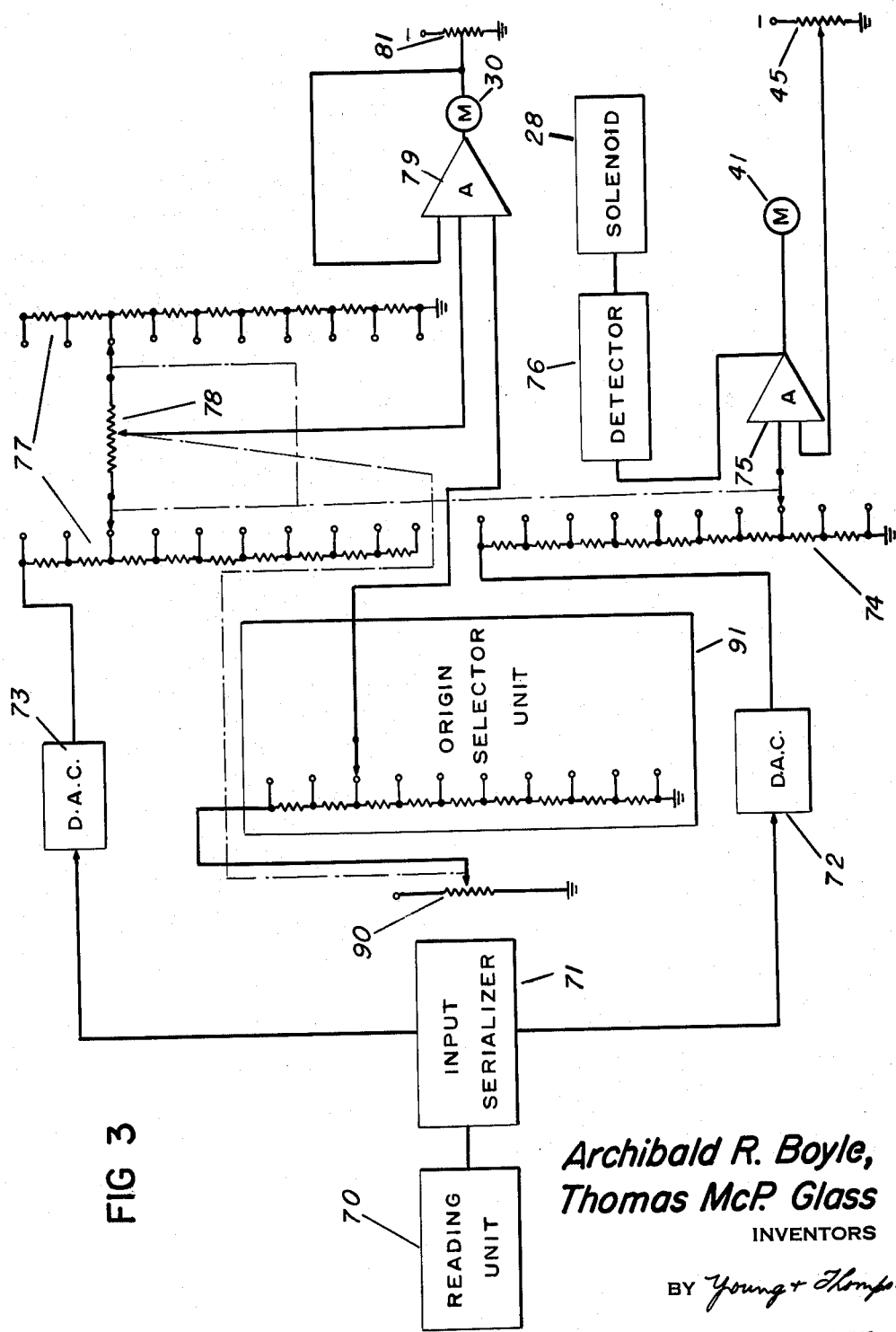

United States Patent Office 3,258,776
Patented June 28, 1966

3,258,776
GRAPH PLOTTING MECHANISM
Archibald Raymond Boyle, Milngavie, Glasgow, and Thomas McPherson Glass, Edinburgh, Scotland, assignors to Dobbie McInnes (Electronics) Ltd., Glasgow, Scotland, a British company
Filed Jan. 9, 1964, Ser. No. 336,832
Claims priority, application Great Britain, Jan. 9, 1963, 972/63
8 Claims. (Cl. 346—29)

This invention relates to an improved plotting apparatus.

When dealing with large plotting areas, e.g. when making maps having an area of 1 sq. metre or more, it has heretofore proved difficult to obtain the desired accuracy because the size of the area has involved large and heavy control mechanisms.

It is an object of the present invention to provide an accurate plotting apparatus capable of use over an area of 1 sq. metre or more.

The present invention is a plotting apparatus comprising an electronic control system, a main gantry system movable under the control of the control system and comprising a gantry and a trolley, a secondary gantry system comprising a gantry and a trolley and movable on the main trolley under the control of the control system, and a plotting head mounted on the secondary trolley.

Figure 1:
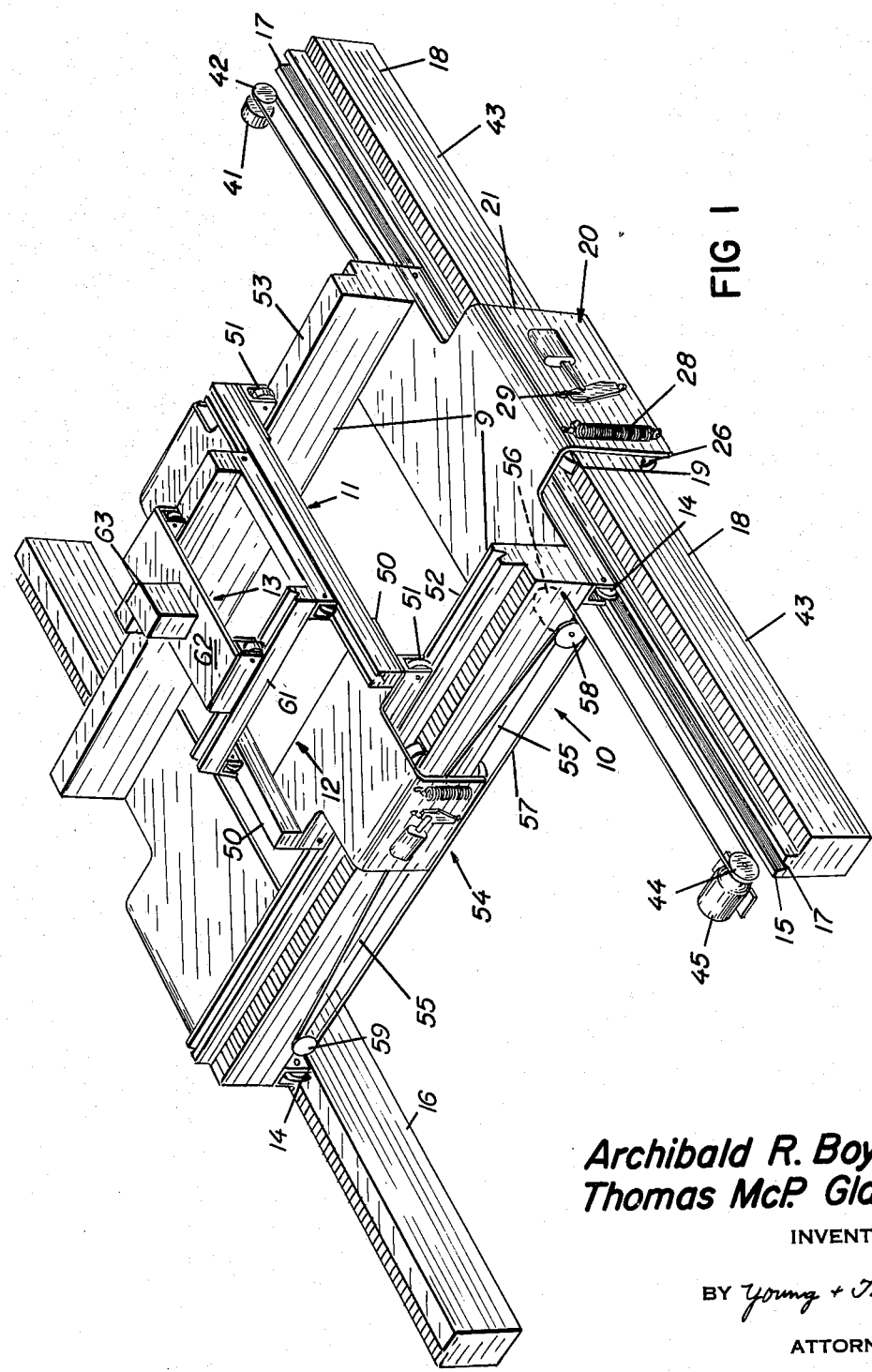
Figure 2:
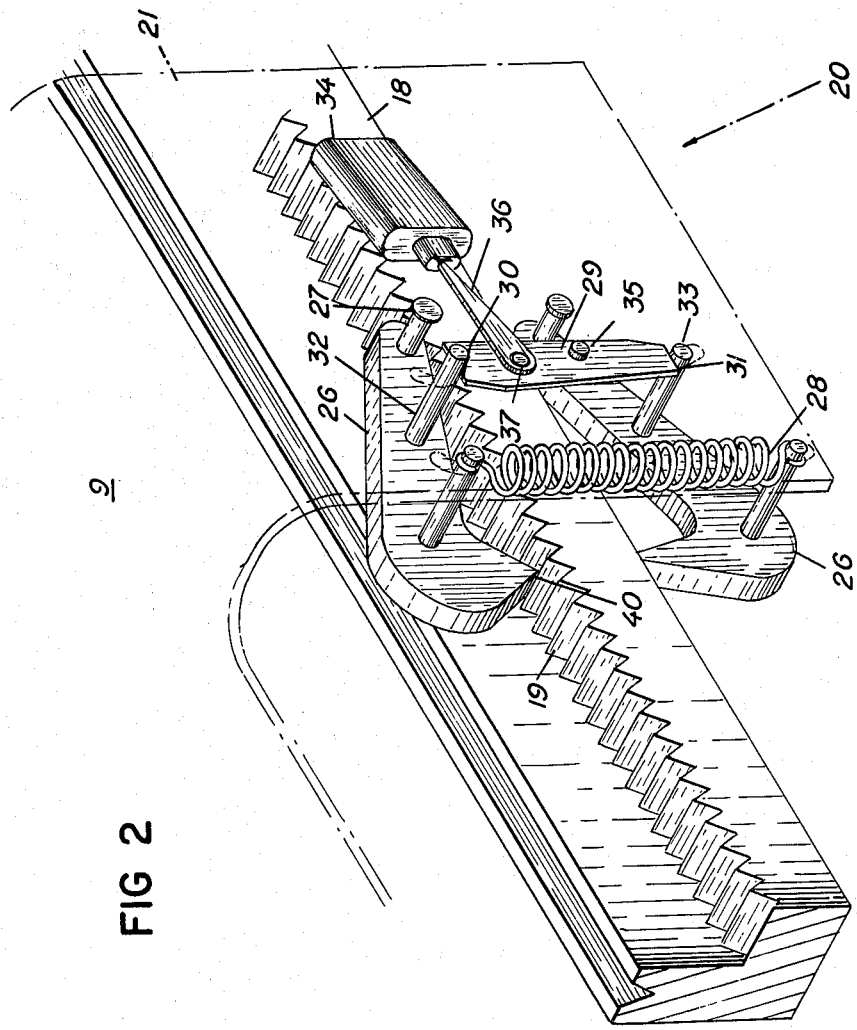

An embodiment of the invention will now be described, by way of example, with reference to the accompanying drawings, in which, FIG. 1 is a perspective view of the gantry system used in the embodiment;

FIG. 2 is a perspective view of a detail of the system shown in FIG. 1 to an enlarged scale; and FIG. 3 is a block diagram of the control system of the embodiment.

Referring now to FIG. 1 the gantry system comprises a main gantry system 10 and 11, and a secondary gantry system 12 and 13. The main gantry system consists of an X-axis gantry 10 and a Y-axis trolley 11, the gantry 10 consisting of a frame 9 mounted on wheels 14 which run on rails 15 and 16. One rail 15 is provided with a V-groove 17 in which the wheels 14 run to ensure accurate alignment, whereas the other rail 16 merely presents a plane surface to the wheels 14. Associated with the rail 15 is bar 18 which is provided on its upper surface with a series of accurately spaced and formed grooves 19 along its length. Position locating means 20, best seen in FIG. 2, is secured to the gantry 10 to co-operate with the bar 18 as will be described hereinafter. The position locating means 20 is mounted on a plate 21 depending from the gantry 10 and consists of a pair of clamping members 26 pivotally mounted on pivots 27 on the plate 21, a spring 28 interconnecting the free ends of the members 26 to bias them to the clamping position, a lever 29 pivotally mounted at 35 on the plate 20 and having shoulders 30 and 31 engaged respectively with projections 32 and 33 on the upper and lower clamping members 26, and a solenoid 34 whose armature 36 is pivotally connected to the lever 29 at a pivot 37. As seen in FIG. 2, the clamping members 26 are disposed one above and one below the bar 18, the upper clamping member 26 being provided with a nose 40 to engage positively a groove 19.

The X-axis gantry 10 is movable along the rails 15 and 16 by means of a servo-motor 41 which drives a pulley 42 round which a driving cord 43 passes. The motor 41 is located at one end of the rail 15 and the cord 43 passes round a second pulley 44 at the other end of the rail 15, the free ends of the cord 43 being secured to the plate 20. A feedback unit 45, in this embodiment a potentiometer, is driven by the pulley 44 and, together with the motor 41, forms part of the control system as will be described hereinafter.

The Y-axis trolley 11 of the main gantry system is very similar to the gantry 10 and consists of a frame 50 mounted on wheels 51 which run on rails 52 and 53 provided on the top of the frame 9 of the X-axis gantry. The rail 52 is grooved to allow for accurate alignment of the trolley 11. Position locating means 54 is provided on the frame 50, is identical to the position locating means 20, and co-operate with a grooved bar 55 on the frame 9 of the gantry 10. The trolley 11 is moved by means of a servo-motor 56 which drives a cord 57 through a pulley 58. The free ends of the cord are again attached to the frame 50. The cord passes round a pulley 59 which drives a feedback unit (not illustrated). In all respects therefore the trolley 11 is similar to the gantry 10.

The secondary gantry system consists of an X-axis gantry 61 and a Y-axis trolley 62, the gantry 61 running on wheels on the trolley 11. The gantry 61 and trolley 62 are similar to, though smaller than, the gantry 10 and trolley 11 but are not provided with position locating means.

The gantry 61 and trolley 62 are again driven by a servomotor, cord, pulley and feedback unit system but these components have been omitted from the drawing in the interests of clarity.

A plotting head 63 is provided on the trolley 62 and may be of any known type. In this embodiment it is of the photographic type and co-operates with photosensitive paper disposed beneath the gantry system.

In operation the gantry system is under the control of the control system that will be described hereinafter, so that signals are fed to the servomotors 41 and 56 which move the gantry 10 and trolley 11 to cover a small section of the photosensitive sheet. When the gantry 10 and trolley 11 have stopped the solenoids 34, which have been energised during movement of the main gantry system, are de-energised, the clamping members 26 move together under the influence of the springs 28 and the upper clamping members 26 each engage a groove 19 to locate the main gantry system very accurately over the required small section of the photosensitive paper.

In fact, closure of the clamping members normally effects movement of the main gantry system from a slightly inaccurate position to the accurate position which is mechanically defined by the grooves engaged by the upper clamping members.

The main gantry system having been accurately located, the secondary gantry system may be moved by means of the servomotors to position the plotting head accurately over the appropriate position on the photosensitive sheet. The plotting head may then be energized to make the appropriate recording on the photosensitive sheet.

The recording having been made, the main gantry system may be moved to cover a new section of the sheet upon energisation of the solenoids 34, whereby the levels 29 are pivoted by the armatures 36 and the shoulders 30 and 31 engage the projections 32 and 33 respectively to force the clamping members 26 apart.

The electrical control system for the gantry system is illustrated in FIG. 3 and is designed to be supplied with digital information on, for example, tape, the information being read by a reading unit 70 and supplied to the input seariaiiser or feed unit. In the serialiser 71, the X and Y co-ordinates are each split up, the most significant digits being passed to main digital-to-analogue converters 72 and the other digits being supplied to secondary digital-to-analogue converters 73. In FIG. 3, the control circuit for one axis is shown, it being understood that the control circuit for the other axis merely duplicates FIG. 3 from the output from the serialiser 71.

Considering only X-axis movement of the gantries the signal from the main converter 72 in FIG. 2 is passed through a major coarse scale control 74, consisting of a stepped resistor the purpose of which will be explained hereinafter, and an amplifier 75 to the servomotor 41. The feedback unit 45 passes a signal back to the amplifier to stop the motor when the correct position of the gantry 10 has been attained. The condition of zero output from the amplifier 75 is detected by a detector 76 which then de-energises the solenoid 28 to locate the gantry 10 accurately in position.

The signal from the secondary converter 73 is passed through a minor coarse scale control 77, consisting of a stepped resistor, and a fine scale control 78 the purpose of which will be explained hereinafter. The signal from the control 78 is passed to an amplifier 79 which supplies the servomotor 30 driving the X-axis gantry 12. Again the feedback unit 31 feeds back a signal to the input of the amplifier 79 to stop the motor when the correct position of the gantry 12 has been attained.

It may thus be seen how control of the movements of the gantry system may be effected when the whole effective area of the system is to be utilised. It is often desirable however to provide variable scaling of the system and this is achieved, according to this invention, by use of the coarse scale controls 74 and 77, which are ganged, the fine scale control 78 and a control potentiometer 90, these also being ganged and an origin selector unit 91 which is supplied with digital information from the converter 72 and has its output connected to the amplifier 79. Again these components are duplicated for the Y-axis and operation will be described for only one axis.

Firstly, the groove pitch on the bar 18 is a submultiple of the area to be covered by the secondary gantry system. If the area to be covered by the secondary gantry system is 10 cm. sq. then the grooves 19 could have a pitch of 1 cm. giving 10 steps for the main gantry system for each 10 cm. sq. area.

The analogue voltage input to the gantry 12 is controlled by the minor, coarse scale control 77. The manually operable control 74 selects the number of grooves to be passed by the gantry 10 for each digit. Thus if the coarse scale controls were set to .8 the full input to the secondary converter 73 would give a movement of 8 cm. and the movement of the gantry 10 would be 8 cm. for each digit change. This gives a fixed scale change in steps of 1 cm. The method of obtaining the variable scale between these steps is as follows.

The secondary gantry system is capable of covering an area twice as great as the required drawing area.

The minor fine scale control 78 can vary the input voltage to the amplifier 79 between each step of the scale control afforded by the control 77, and ganged to this is the manually operable control potentiometer 90 which varies the voltage applied to the chain of precision resistors which makes up the origin selector unit 91. The voltage across these resistors is fed to the amplifier 79 as an origin offset voltage and the point on the chain is selected by the digit fed to the converter 72.

As an example, assume a square table of side 1 metre with a main gantry system designed to cover the 1 metre by 10 cm. steps. This gives the travel on the secondary gantry system of 20 cm. to allow for origin offset and the groove pitch could be 1 cm.

If it was desired to set the variable scale to .875 of full scale (full scale equals 99.99 cm. for a digital input of 9999) then the coarse scale controls would be set to 8 and the fine scale control 78 would be set to .75 of its travel (or to 7.5 on a 10 turn helical potentiometer unit).

If a digital input is 7963 then the position of the printing head would be obtained as follows:

|  | Cms. |
|---|---|
| The most significant digit 7 will select 7 steps of 8 teeth to give a main gantry movement of 56 cms. | 56 |
| The most significant digit 7 would select a position on the chain of resistors (unit 91) to give $7/10$ of the voltage across the chain. The voltage across the chain would be set by the control potentiometer 90 ganged to the fine scale control 78 and in this case would be .75 of the voltage to give 10 cm. of origin movement ($7/10$ of .75×10 cm.) cm | 5.25 |
| The last three digits would give an output from the converter 73 of $963/1000$ of .875 of the voltage to give 10 cm. movement ($963/1000$ of .875×10 cm.) | 8.42625 |
| Total secondary gantry movement | 13.67625 13.67625 |
| Total movement (9999=99.99 cm.) | 69.67625 |
| .875 of 7963 | 69.67625 |

If for the same digital input, the scale had been set to .628 the movement would be made up as follows:

|  | Cms. |
|---|---|
| Significant digit gives 7 times 6 teeth | 42 |
| Significant digit 7 gives $7/10$ of .28 max. origin shift | 1.96 |
| Secondary gantry movement equals $963/1000$ of .628 of the voltage to give 10 cm. movement | 6.04764 |
| Total movement (79.63 cm.×.628= 50.00764) | 50.00764 |

The methods of scaling for both the X and Y axis are exactly the same and can be varied independently.

The embodiment described may be modified by providing pneumatically or hydraulically operated position locating means or by replacing the grooved bar by other means on which a number of accurate positions are mechanically defined, e.g., by means of tapered holes.

We claim:

1. Plotting apparatus comprising an electronic control system, a main gantry system movable under the control of the control system and comprising a gantry and a trolley, said gantry and trolley being each provided with position-locating means actuable to position the main gantry system positively in one of a number of accurately located and mechanically defined positions, means defining said positions comprising a bar having grooves therein, said locating means for locating said main gantry system in said positions comprising an actuator, at least one clamping member movable by the actuator into a said groove, a secondary gantry system comprising a gantry and a trolley and movable on the main trolley under the control of said control system, and a plotting head mounted on the secondary trolley.

2. Plotting apparatus as claimed in claim 1, there being a plurality of said clamping members, and spring means biasing said clamping members toward the clamping position.

3. Plotting apparatus as claimed in claim 1, said actuator comprising a solenoid having an armature which is operatively connected to said at least one clamping member through a lever.

4. Plotting apparatus as claimed in claim 1, in which said control system includes an input reading unit, an input feed unit supplied by said reading unit, and, in cascade, for each gantry and trolley, a digital-to-analog converter fed by said feed unit, an amplifier fed by said converter, and a servomotor controlled by said amplifier.

5. Plotting apparatus as claimed in claim 4, in which a feedback unit is associated with each servomotor and supplies a signal to the input of the amplifier controlling that servomotor.

6. Plotting apparatus as claimed in claim 4, and a pair of ganged stepped potentiometers, the signal to each said amplifier being supplied through one of said potentiometers for each axis of movement, whereby coarse control of the scale of the plotting apparatus may be effected in discrete steps.

7. Plotting apparatus as claimed in claim 6, in which for each axis of movement, the signal to the amplifier for the secondary gantry or trolley is supplied through a fine scale control which is ganged with a control potentiometer, and an origin-selector unit receiving a signal from the control potentiometer and supplying an output signal to the secondary gantry or trolley in accordance with a signal from the main converter.

8. Plotting apparatus as claimed in claim 7, in which the ganged potentiometers and the control potentiometer are manually adjustable.

References Cited by the Examiner

UNITED STATES PATENTS

| | | | |
|---|---|---|---|
| 2,620,256 | 12/1952 | Kerns et al. | 346—32 |
| 2,717,979 | 9/1955 | Gardiner | 318—19 |
| 2,924,810 | 2/1960 | Horeth | 33—1 X |
| 3,019,072 | 1/1962 | Bose et al. | 346—29 |

LOUIS J. CAPOZI, *Primary Examiner.*

LEO SMILOW, *Examiner.*

JOSEPH W. HARTARY, *Assistant Examiner.*